UNITED STATES PATENT OFFICE.

AUGUSTUS A. HAYES, OF BOSTON, MASSACHUSETTS, ASSIGNOR TO GEO. ASHMAN AND CHS. PHELPS.

IMPROVEMENT IN PROCESSES FOR EXTRACTING OIL FROM COTTON-SEED.

Specification forming part of Letters Patent No. 14,610, dated April 8, 1856.

*To all whom it may concern:*

Be it known that I, AUGUSTUS A. HAYES, of Boston, in the county of Suffolk and Commonwealth of Massachusetts, have invented an Improved Mode of Extracting Oil from Cotton-Seed; and I do hereby declare that the following is a full and exact description thereof.

The nature of my invention consists in first removing the cotton-covered envelope of the kernels of the seed by a simple and economical method, and using the cleaned kernels alone for expressing the oil.

By my method the cotton and shell of the seed, weighing one-half of the whole weight of the seed, are saved for the manufacture of coarse paper or as a manure, containing all the ferment and salts of the seed for enriching the soil. After the expressing of the oil from the kernels the meal is left with all its nutritive qualities unaltered, and constitutes a highly valuable food in a form suited to transportation or storage.

I am aware that efforts have been made to express oil directly from cotton-seed, and that a small proportion may be thus obtained. It has also been proposed to destroy the covering of the kernel in part by using sulphuric acid before expressing the oil from the seed. Another plan which has been proposed is that of softening the husk by long maceration in cold water, or hastening the softening action of the water by heat or steam. These modes are expensive and are sure to alter the composition of the kernels, thereby injuring both the oil and the meal, rendering the latter unfit for storage or transportation. I disclaim these methods, and proceed to describe my invention.

Cotton-seed as separated from the staple and covered by the attached fibers is matured as a seed, but not fully ripened as a product adapted to a manufacture. Its investing hull is not only hydrous, but contains vegetable albumen in a soluble state. The same fact applies to the kernel, where immature starch exists in the state of an emulsion with oil, from which the latter cannot be separated by expression, and only imperfectly by chemical solvents. By exposing the recent seed to the temperature of 85° Fahrenheit, either in the sun's rays or by artificial heat in the shade, a change commences during which the proximate elements of the seed mature and take their appropriate places in the organism, the husk becomes brittle, breaking across readily, while it retains its tenacity in the direction of its length. A long exposure to a lower temperature—as 60° Fahrenheit—continued for four or six months suffices to produce the same change, and a temperature of 110° Fahrenheit exerts no injurious influence and shortens the time required for maturation.

To enable others to use my invention it must be borne in mind that the seeds as detached by the cotton-gin should be placed under cover and spread out in thin layers soon after they are separated from the staple to prevent fermentation. The partly-dried seed can then be matured by exposure to the sun's rays in trays with stirring or by placing them on a succession of board-floors or malting-tiles, when they can be stirred in a room filled with pure air, heated from 100° Fahrenheit to 110° Fahrenheit by a stove or steam-pipes or other artificial heat. By crushing in a mortar some of the seeds it is easy to follow the maturation, and when the husks break short and the kernels separately cleanly the seed is fit for crushing. This operation may be effected by the ordinary crushing-mill, and the husks separated from the meal by a sieve of about ten openings to a linear inch in the usual way of coarse-bolting. About fifty parts of cotton and husk will thus be separated, leaving about fifty parts of meal from one hundred of matured seed. The husks and cotton may be used as cotton-waste is or composted to form manure. Generally the meal contains thirty-two per cent. of its weight of a bland oil, which is yielded on expression in the way adapted for flaxseed or oily nuts. What remains in a solid cake is the starch with albuminous and fatty matter, constituting an excellent food for swine or cattle.

I do not claim any mode of crushing the matured seed or expressing the oil from the kernels.

What I claim, and wish to secure by Letters Patent, is—

The maturing of the cotton-seed after it has been separated from the cotton by heat artificially applied, so as to render the husk brittle and easily separable from the kernel.

AUGUSTUS A. HAYES.

Attest:
    A. N. MOORE,
    D. R. NASH.